(12) United States Patent
Barbas et al.

(10) Patent No.: US 9,135,315 B2
(45) Date of Patent: Sep. 15, 2015

(54) DATA MASKING

(71) Applicant: International Business Machines Corporation, Armonk, NY (US)

(72) Inventors: Pedro Barbas, Dublin (IE); Austin Clifford, Dublin (IE); Gareth Jenkins, Dublin (IE); Brian McKeown, Dublin (IE)

(73) Assignee: Internatonal Business Machines Corporation, Armonk, NY (US)

( * ) Notice: Subject to any disclaimer, the term of this patent is extended or adjusted under 35 U.S.C. 154(b) by 179 days.

(21) Appl. No.: 13/777,355

(22) Filed: Feb. 26, 2013

(65) Prior Publication Data

US 2013/0282697 A1    Oct. 24, 2013

(30) Foreign Application Priority Data

Apr. 18, 2012 (GB) .................................. 1206800.3

(51) Int. Cl.
*G06F 17/30* (2006.01)

(52) U.S. Cl.
CPC .... *G06F 17/30554* (2013.01); *G06F 17/30483* (2013.01)

(58) Field of Classification Search
CPC ..................... G06F 17/30554; G06F 17/30483
USPC ....................................................... 707/722
See application file for complete search history.

(56) References Cited

U.S. PATENT DOCUMENTS

| | | | |
|---|---|---|---|
| 7,917,770 B2* | 3/2011 | Gopinath et al. ............. 713/189 |
| 7,974,942 B2* | 7/2011 | Pomroy et al. ............... 707/610 |
| 7,979,410 B2 | 7/2011 | Pattabhi et al. | |
| 8,055,668 B2* | 11/2011 | Pomroy et al. ............... 707/757 |
| 8,341,104 B2* | 12/2012 | Manickam et al. ............ 706/47 |
| 8,793,756 B2* | 7/2014 | Mock et al. ....................... 726/1 |
| 8,825,715 B1* | 9/2014 | Thwaites ....................... 707/804 |
| 2006/0074897 A1* | 4/2006 | Fergusson ........................ 707/4 |
| 2006/0248592 A1 | 11/2006 | Agrawal et al. | |
| 2008/0065665 A1 | 3/2008 | Pomroy et al. | |
| 2009/0049512 A1 | 2/2009 | Manickam et al. | |
| 2009/0100527 A1 | 4/2009 | Booth et al. | |
| 2009/0132575 A1 | 5/2009 | Kroeschel et al. | |
| 2009/0204631 A1 | 8/2009 | Pomroy et al. | |

(Continued)

FOREIGN PATENT DOCUMENTS

WO    2004066128 A2    8/2004

OTHER PUBLICATIONS

D. Edgar, "Data Sanitization Techniques," Net 2000 Ltd., 2003-2004, 8 pages, http://www.Net2000Ltd.com.
IBM United States Software Announcement 211-161, "IBM InfoSphere Optim Data Masking Solution V2.2 Lets You Mask and Transform Sensitive Data," May 24, 2011, pp. 1-11.

(Continued)

*Primary Examiner* — Apu Mofiz
*Assistant Examiner* — Jared Bibbee
(74) *Attorney, Agent, or Firm* — Cantor Colburn LLP

(57) ABSTRACT

Aspects include data masking in database operations including intercepting a database query and identifying masked data in the query. The masked data in the query is unmasked by substituting the masked data with equivalent real values. The unmasked query is sent to the database engine, and a result provided by the database engine in response to the unmasked query is intercepted. The values in the result that correspond to sensitive information are identified. The result is masked by substituting the values in the result corresponding to sensitive information with masked equivalents. The masked result is returned to a user.

19 Claims, 17 Drawing Sheets

(56) References Cited

U.S. PATENT DOCUMENTS

| | | | |
|---|---|---|---|
| 2010/0042643 | A1 | 2/2010 | Pattabhi et al. |
| 2010/0205189 | A1* | 8/2010 | Ebrahimi et al. ............. 707/757 |
| 2011/0113050 | A1 | 5/2011 | Youn et al. |
| 2013/0086088 | A1* | 4/2013 | Alton et al. .................. 707/754 |
| 2013/0132352 | A1* | 5/2013 | Kaushik et al. ............... 707/693 |
| 2013/0144901 | A1* | 6/2013 | Ho et al. ....................... 707/769 |

OTHER PUBLICATIONS

IBM, "InfoSphere Optim Data Lifecycle Management Solutions," 2012, 2 pages, http://www-01.ibm.com/software/data/optim/.

Dataguise, Inc., "Why Add Data Masking to Your Best Practices for Securing Sensitive Data," 2010, 8 pages, www.dataguise.com.

U.K. International Search Report for International Application No. GB1206800.3; Date of Mailing Jul. 13, 2012; 4 pages.

* cited by examiner

Orders Table 600

| order key | cust key | Order status | Total price | Order date | Order priority | clerk | Ship priority | comment |
|---|---|---|---|---|---|---|---|---|
| 100 | 735016 | O | 214033.24 | 2011-01-06 | 4-NOT SPECIFIED | Clerk#000002881 | 0 | regular deposits sleep closely regular, regular packages. |
| 101 | 139987 | O | 136170.46 | 2011-01-06 | 3-MEDIUM | Clerk#000002091 | 0 | blithely ironic accounts lose slyly about the pending, regular accounts |
| 102 | 3580 | O | 160238.63 | 2011-01-06 | 2-HIGH | Clerk#000002976 | 0 | unusual deposits dazzle furiously blithely regular pinto beans. pending foxes |
| 103 | 145498 | O | 117675.06 | 2011-01-06 | 4-NOT SPECIFIED | Clerk#000000449 | 0 | carefully ironic deposits are quickly blithely even |

Figure 6

Line Item Table 700

| orderkey | partkey | suppkey | Line number | quantity | Extended price | shipdate | commitdate | receiptdate | shipinstruct | shipmode |
|---|---|---|---|---|---|---|---|---|---|---|
| 100 | 310144 | 10145 | 1 | 28 | 32315.64 | 2011-01-06 | 1998-05-13 | 1998-06-07 | COLLECT COD | TRUCK |
| 100 | 579892 | 42404 | 2 | 22 | 43381.14 | 2011-01-06 | 1998-04-12 | 1998-06-29 | DELIVER IN PERSON | SHIP |
| 100 | 230749 | 43254 | 3 | 46 | 77267.58 | 2011-01-06 | 1998-04-10 | 1998-05-22 | TAKE BACK RETURN | SHIP |
| 100 | 190116 | 15123 | 4 | 14 | 16885.54 | 2011-01-06 | 1998-05-01 | 1998-06-03 | COLLECT COD | MAIL |
| 100 | 267192 | 4708 | 5 | 37 | 42889.66 | 2011-01-06 | 1998-04-16 | 1998-03-31 | TAKE BACK RETURN | TRUCK |
| 101 | 591410 | 28944 | 1 | 49 | 73568.11 | 2011-01-06 | 1996-05-27 | 1996-06-29 | DELIVER IN PERSON | REG AIR |
| 101 | 816666 | 4215 | 2 | 36 | 56974.32 | 2011-01-06 | 1996-05-01 | 1996-06-04 | DELIVER IN PERSON | AIR |
| 101 | 692087 | 29627 | 3 | 12 | 12948.6 | 2011-01-06 | 1996-04-20 | 1996-04-12 | COLLECT COD | MAIL |
| 102 | 444568 | 19585 | 1 | 37 | 55963.98 | 2011-01-06 | 1997-08-02 | 1997-08-07 | TAKE BACK RETURN | SHIP |
| 102 | 846190 | 33739 | 2 | 34 | 38629.1 | 2011-01-06 | 1997-07-28 | 1997-08-26 | TAKE BACK RETURN | SHIP |

Figure 7

Customer Table 800

| custkey | name | address | Nation key | phone | acctbal | Mkt segment | comment |
|---|---|---|---|---|---|---|---|
| 3580 | John Andrews | 34 Kennilworth Close, Dubin 6W | 7 | 17-973-934-8451 | 9446.07 | FURNITURE | Customer is an important customer with many accounts |
| 9987 | Peter Shaw | 11 Andrews Lane, Dubin 2 | 15 | 25-626-373-4989 | 2642.81 | HOUSEHOLD | Large account holder |
| 5016 | Joe Anderson | 27 Islandbrige Tce, Dubin 8 | 10 | 20-610-163-3225 | 1154.19 | HOUSEHOLD | New customer. |

Figure 8

Results Table 900 (before modification)

| c_name | c_address | o_orderpriority | sum_quantity | max_price |
|---|---|---|---|---|
| John Andrews | 34 Kennilworth Close, Dubin 6W | 2-HIGH | 111 | 55963.98 |
| Peter Shaw | 11 Andrews Lane, Dubin 2 | 3-MEDIUM | 97 | 73568.11 |
| Joe Anderson | 27 Islandbrige Tce, Dubin 8 | 4-NOT SPECIFIED | 147 | 77267.58 |

Figure 9

| Masking Catalog 1000 (before) | | | | | | |
|---|---|---|---|---|---|---|
| User | Session Id | Real Datatype | Real Length | Real Value | Masked Datatype | Masked Length | Sequence Value | Masked Value |

Figure 10

Masking Catalog 1000 (during)

| User | Session Id | Real Datatype | Real Length | Real Value | Masked Datatype | Masked Length | Sequence Value | Masked Value |
|---|---|---|---|---|---|---|---|---|
| psmith | 1011 | Date | 10 | 2011-01-03 | Date | 10 | 1 | 1900-01-01 |
| psmith | 1011 | Decimal | 15,2 | 50,000.00 | Number | 5 | 1 | 10000 |
| psmith | 1011 | Char | 1 | O | Char | 1 | 1 | a |

Figure 11

Masking Catalog 1000 (after)

| User | Session Id | Real Datatype | Real Length | Real Value | Masked Datatype | Masked Length | Sequence Value | Masked Value |
|---|---|---|---|---|---|---|---|---|
| psmith | 1011 | Date | 10 | 2011-01-03 | Date | 10 | 1 | 1900-01-01 |
| psmith | 1011 | Decimal | 15,2 | 50,000.00 | Number | 5 | 1 | 10000 |
| psmith | 1011 | Char | 1 | O | Char | 1 | 1 | a |
| | | | | | | | | |
| psmith | 1011 | Varchar(25) | 25 | John Andrews | Char | 12 | 1 | aaaaaaaaaaaa |
| psmith | 1011 | Varchar(25) | 25 | Peter Shaw | Char | 10 | 1 | aaaaaaaaaa |
| psmith | 1011 | Varchar(25) | 25 | Joe Anderson | Char | 12 | 2 | aaaaaaaaaaab |
| psmith | 1011 | Varchar(40) | 40 | 34 Kennilworth Close, Dubin 6W | Char | 30 | 1 | aaaaaaaaaaaaaaaaaaaaaaaaaaaaaa |
| psmith | 1011 | Varchar(40) | 40 | 11 Andrews Lane, Dubin 2 | Char | 24 | 1 | aaaaaaaaaaaaaaaaaaaaaaaa |
| psmith | 1011 | Varchar(40) | 40 | 27 Islandbrige Tce, Dubin 8 | Char | 27 | 1 | aaaaaaaaaaaaaaaaaaaaaaaaaaa |
| psmith | 1011 | Char(15) | 15 | 2-HIGH | Char | 6 | 1 | aaaaaa |
| psmith | 1011 | Char(15) | 15 | 3-MEDIUM | Char | 8 | 1 | aaaaaaaa |
| psmith | 1011 | Char(15) | 15 | 4-NOT SPECIFIED | Char | 15 | 1 | aaaaaaaaaaaaaaa |
| psmith | 1011 | Decimal(15,2) | 15 | 111 | Number | 3 | 1 | 100 |
| psmith | 1011 | Decimal(15,2) | 15 | 97 | Number | 2 | 1 | 10 |
| psmith | 1011 | Decimal(15,2) | 15 | 147 | Number | 3 | 2 | 101 |
| psmith | 1011 | Decimal(15,2) | 15 | 55963.98 | Number | 5 | 2 | 10001 |
| psmith | 1011 | Decimal(15,2) | 15 | 73568.11 | Number | 5 | 3 | 10002 |
| psmith | 1011 | Decimal(15,2) | 15 | 77267.58 | Number | 5 | 4 | 10003 |

Figure 12

Sequence Table 1300

| User | Session Id | Masked-Datatype | Masked-Length | Sequence last Val | Sequence next Val |
|---|---|---|---|---|---|
| psmith | 1011 | Date | 10 | 1 | 2 |
| psmith | 1011 | Number | 2 | 1 | 2 |
| psmith | 1011 | Number | 3 | 2 | 3 |
| psmith | 1011 | Number | 5 | 4 | 5 |
| psmith | 1011 | Char | 1 | 1 | 2 |
| psmith | 1011 | Char | 6 | 1 | 2 |
| psmith | 1011 | Char | 8 | 1 | 2 |
| psmith | 1011 | Char | 10 | 1 | 2 |
| psmith | 1011 | Char | 12 | 2 | 3 |
| psmith | 1011 | Char | 15 | 1 | 2 |
| psmith | 1011 | Char | 24 | 1 | 2 |
| psmith | 1011 | Char | 27 | 1 | 2 |
| psmith | 1011 | Char | 30 | 1 | 2 |

Figure 13

Masking Policy Table 1400

| Policy Id | Policy Name | Description | Data type | Value |
|---|---|---|---|---|
| 1 | max_distinct_vals | Max distinct number of distinct values in a result set for a given column. | Integer | 100 |
| 2 | max_varchar_length | Maximum masked length of a varchar | Integer | 30 |

Figure 14

Results Table 900 (after modification)

| c_name | c_address | o_orderpriority | sum_quantity | max_price |
|---|---|---|---|---|
| aaaaaaaaaaaa | aaaaaaaaaaaaaaaaaaaaaaaaaaaa | aaaaaa | 100 | 10001 |
| aaaaaaaaaaaa | aaaaaaaaaaaaaaaaaaaaaaaaaaaa | aaaaaaa | 10 | 10002 |
| aaaaaaaaaaab | aaaaaaaaaaaaaaaaaaaaaaaaaaaa | aaaaaaaaaaaaaa | 101 | 10003 |

Figure 15

Masking Catalog 1000 (appended records after second query)

| User | Session Id | Real Datatype | Real Length | Real Value | Masked Datatype | Masked Length | Sequence Value | Masked Value |
|---|---|---|---|---|---|---|---|---|
| ... | ... | ... | ... | ... | ... | ... | ... | ... |
| Psmith | 1011 | Integer | 4 | 3580 | Number | 4 | 1 | 1000 |
| Psmith | 1011 | Integer | 1 | 7 | Number | 1 | 1 | 0 |
| Psmith | 1011 | Char(15) | 12 | 17-973-934-8451 | Char | 15 | 2 | aaaaaaaaaaaaaab |
| psmith | 1011 | Decimal(15,2) | 6 | 9446.07 | Number | 4 | 2 | 1001 |
| psmith | 1011 | Char(10) | 8 | FURNITURE | Char | 9 | 1 | aaaaaaaa |
| psmith | 1011 | Varchar(117) | 81 | haggle carefully above the final requests. regular accounts play upon the courts. Careful | Char | 30 | 2 | aaaaaaaaaaaaaaa aaaaaaaaaaaaaab |

Figure 16

Results Table 900 (after modification) of continued example

| c_cust key | c_name | c_address | c_nation key | c_phone | c_acct bal | c_mktseg ment | c_comment |
|---|---|---|---|---|---|---|---|
| 1000 | aaaaaaaa aaaa | aaaaaaaaaaaaaa aaaaaaaaaaaaaa | 0 | aaaaaaa aaaaaa b | 1001 | aaaaaaaa | aaaaaaaaaaaaaaaa aaaaaaaaaaaaab |

Figure 17

DATA MASKING

PRIORITY

This application claims priority to Great Britain Patent Application No. 1206800.3, filed 18 Apr. 2012, and all the benefits accruing therefrom under 35 U.S.C. §119, the contents of which in its entirety are herein incorporated by reference.

BACKGROUND

The present invention relates to masking database operations so that sensitive parts of an information set are hidden while other parts of the information set are disclosed. In particular, the present invention relates to masking database operations in a database management system (DBMS) such that a minimum amount of information is shared.

One of the most valuable assets of an organization is the production data that it accumulates as a result of its computer operations. Organizations need to share this production data with various constituents for a variety of business purposes, while also protecting sensitive or personally identifiable aspects of the information. At the same time, various parties also have a legitimate need to gain access to this production data. For example, most organizations need to copy production data into test and development environments to allow application developers to test specific components that have failed in production.

Production data is often one of the best sources of data for meaningful tests because it contains actual special cases and quantity structures that programs have to be able to support. In addition, production data poses the unique ability to be able to reproduce a specific real-world problem or scenario that has occurred in a production environment.

Contemporary techniques for sharing and protecting sensitive data include techniques for masking data based on the nature of masking policies, such as that described in U.S. Patent Publication No. 20090100527 "Real-time Enterprise Data Masking."

Another contemporary technique for sharing information containing sensitive data is by to provide random test data based on masking algorithms in place of the sensitive data. This random test data is generated based on rules such as the type, length and range of data and may be used to test software components for various test case scenarios.

SUMMARY

Embodiments include a method, system, and computer program product for data masking in database operations. Embodiments include intercepting a database query and identifying masked data in the query. The masked data in the query is unmasked by substituting the masked data with equivalent real values. The unmasked query is sent to the database engine, and a result provided by the database engine in response to the unmasked query is intercepted. The values in the result that correspond to sensitive information are identified. The result is masked by substituting the values in the result corresponding to sensitive information with masked equivalents. The masked result is returned to a user.

BRIEF DESCRIPTION OF THE SEVERAL VIEWS OF THE DRAWINGS

Embodiments will now be described, by way of example only, with reference to the following drawings in which:

FIG. 6 depicts an orders table in accordance with an embodiment;

FIG. 7 depicts a line item table in accordance with an embodiment;

FIG. 8 depicts a customer table in accordance with an embodiment;

FIG. 9 depicts a results table before modification in accordance with an embodiment;

FIG. 10 depicts an empty catalog table in accordance with an embodiment;

FIG. 11 depicts a catalog table after the query modification method has been executed in accordance with an embodiment;

FIG. 12 depicts the catalog table after the result modification method has been executed in accordance with an embodiment;

FIG. 13 depicts a sequence table in accordance with an embodiment;

FIG. 14 depicts a masking policy table in accordance with an embodiment;

FIG. 15 depicts masked data returned to a user in accordance with an embodiment;

FIG. 16 depicts records appended to the masking catalog in accordance with an embodiment; and FIG. 17 depicts a returned result set for the records in FIG. 16 in accordance with an embodiment.

DETAILED DESCRIPTION

Figure 1:
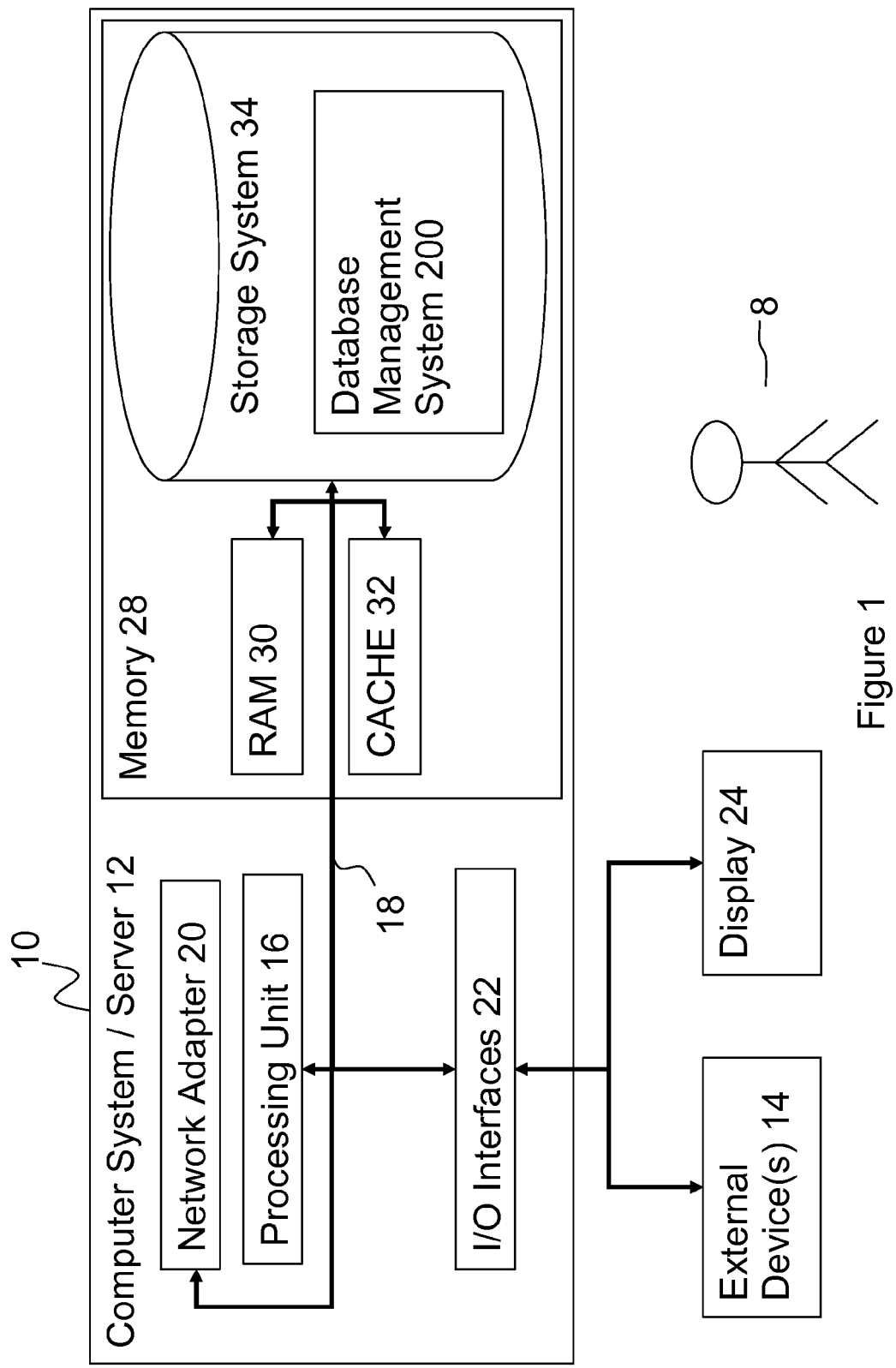
FIG. 1 is a deployment diagram of a database management system according to an embodiment.

Embodiments are directed to systems, methods, and computer program products for data masking database operations. Embodiments include intercepting a database query and identifying masked data in the query. The masked data in the query is unmasked by substituting the masked data with equivalent real values. The unmasked query is sent to the database engine, and a result provided by the database engine in response to the unmasked query is intercepted. The values in the result that correspond to sensitive information are identified. The result is masked by substituting the values in the result corresponding to sensitive information with masked equivalents. The masked result is returned to a user.

In embodiments described herein, structured query language (SQL) queries from a user and the resulting data set returned by the database management system (DBMS) are intercepted and dynamically masked using a sequential masking algorithm. The dynamic masking assignments are stored as real value and masked value pairs in a catalog. The masked value assignments are such that there is little meaning to be gleaned from the masked data. The masked data could in fact be transmitted in non-encrypted form. A customer could, for example, send the resulting data set to a service provider via conventional email. This offers a major benefit to customers who are reluctant to send encrypted information off-site. Alternatively, a DBMS provider employee could be granted query-with-masked-data access-only directly on a production database. The employee could then interactively query the database (either on-site or remotely) via the masking system to diagnose functional or performance issues with the DBMS or associated product.

A major business benefit and technical advancement of the least information method as used in embodiments described herein is that customers are comfortable sending, or allowing a provider to have access to the resulting masked result sets. This can be done while preserving the key characteristics of the data, including referential integrity, cardinality, data-type and selectivity, thereby facilitating an engineer to make a successful root cause diagnosis. Another benefit is that the masking is performed dynamically and there is no need to apply a set of masking rules to a point-in-time copy of the entire database. In an embodiment, each masked equivalent is a unique mask that can be chosen from a non-repeating sequence.

In an embodiment, all fields are masked. This can be the default mode of an embodiment that requires minimal configuration and little or no set up time. In an embodiment, the masked and associated data is deleted at the end, or completion, of a user session. In an embodiment, a list of the sensitive types of data for masking and unmasking is maintained. Suitably masked and associated data may be further associated with a user account. The associated masked data may be selected when the user logs into a user account. The equivalent masked length of all data types may be the same as the original real value length. In an embodiment, the equivalent masked length is shortened if the data type is fixed length and the length exceeds a maximum length policy. In addition, the masked data may be with its associated real value in a catalog.

In accordance with an embodiment, a least information masking algorithm is applied in two ways. First, queries submitted by the user are examined to identify local predicates, that is predicates involving a literal value (for example customer name="John Anderson"). If a local predicate value in a user query does not already exist in the catalog then this means it is a real value. A starting point for a problem investigation can be a non-sensitive piece of information, for example, starting with GEO area="America" and drilling down from there. Alternatively, the customer may be happy to provide a developer with a specific value only, for example an identifier of an internal sales representative. In this case, the real data value is assigned a masked equivalent value and this is stored in the masking catalog for later use. If the value does already exist in the catalog then this is a previously masked value and it is substituted by looking up the associated real value from the catalog. The resulting query with substituted real values is then submitted against the DBMS.

A second way that an embodiment uses a least information masking algorithm is that the result set from the DBMS is intercepted and the masking algorithm is applied. A lookup is performed for each real value in the result set. If a mapping for the real value already exists in the catalog then the real value is substituted with its masked equivalent. If the mapping does not already exist, then a new mapping is allocated based on the next available sequential masked value. This masked result set is then returned to the user. Thus, the embodiment involves unmasking structured query language (SQL) queries submitted by the user and masking the results returned.

In an embodiment, the equivalent masked length of all data types is the same as the original real value length unless the column is a character or variable character data type and the length exceeds the policy (the max_varchar_length policy). This will restrict the available range of values for each data type and length. Furthermore, it means that joins across data types will be possible such that a two character value can be joined to a two variable character value, and a small integer to a regular integer. In some databases, the data type of joined tables may not be exactly the same, perhaps due to a design oversight, for example, integer to small integer or character (2) to variable character(2). By using the same range of values for similar data types these join relationships are preserved in the masked equivalent data because the value in the both tables being joined will be masked with the same value. Consequently, variable character data types and characters will use the same masked domain space. Similarly integer, decimals, small integers will use the same domain space (called "numbers" in the exemplary embodiments). Masking policies, such as maximum number of distinct values or maximum length of a variable character column are specified in a masking policy table.

In an embodiment, the masking catalog is protected. That is, the catalog is not visible to any user other than the administrator. An embodiment uses a least information method, and the data in all columns are masked to the user in result sets. In another embodiment, policy rules are used to define which columns are masked. For example, columns containing numeric values may not be required to be masked, as without the descriptive context this information may be harmless in isolation.

Embodiments of the masking system work within the confines of existing database permissions. Therefore, the existing table permissions, column level security, or label based security take precedence.

Embodiments assume that the masking dictionary is instantiated and built up during a single user session. The catalog is transient, thus, when the user disconnects from the database, the catalog entries for that user and session are removed. This implementation can be chosen to minimize the required disk storage requirement for the catalog. In another embodiment, users are granted permissions to set the persistence scope (optionally with a time limit) per session or to allow the DBMS to define a quota be it data or time based.

Embodiments described herein are contrasted with contemporary techniques for protecting sensitive data. Contemporary techniques have several limitations including their inability to replicate all the real-world test cases or specific problems that have occurred in production environments. Another limitation of existing techniques is the risk of corrupting sensitive data by manipulations performed on the sensitive data during data masking. In addition, contemporary techniques do not provide a method for minimal information sharing of data in a database management system.

Referring now to FIG. 1, a deployment diagram of a computer system node 10 suitable for deploying an embodiment is generally shown. Computer system node 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that comprise any of the above systems or devices, and the like.

Computer system/server 12 may be described in the general context of computer system executable instructions, such as program modules, being executed by a computer system. Generally, program modules may comprise routines, programs, objects, components, logic, data structures, and so on that perform particular tasks or implement particular abstract data types. Computer system/server 12 may be embodied in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer system node 10 is shown in the form of a general purpose computing device. The components of computer system/server 12 may include, but are not limited to, one or more processors or processing units 16, a system memory 28, and a bus 18 that couples various system components including system memory 28 to processor unit 16.

Bus 18 represents one or more of any of several types of bus structures, comprising a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one computer program product having a set (for example, at least one) of program modules that are configured to carry out the functions of embodiments of the invention.

Database management system (DBMS) 200 may be stored in memory 28 by way of example, and not as a limitation, as well as an operating system, one or more application programs, other program modules, and program data. Each of the operating system, one or more application programs, other program modules, and program data or some combination thereof, may include an implementation of a networking environment.

Computer system/server 12 may also communicate with one or more external devices 14 such as a keyboard, a pointing device, a display 24, one or more devices that enable a user 8 to interact with computer system/server 12 and/or any devices (for example a network card or modem) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (for example the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Figure 2:
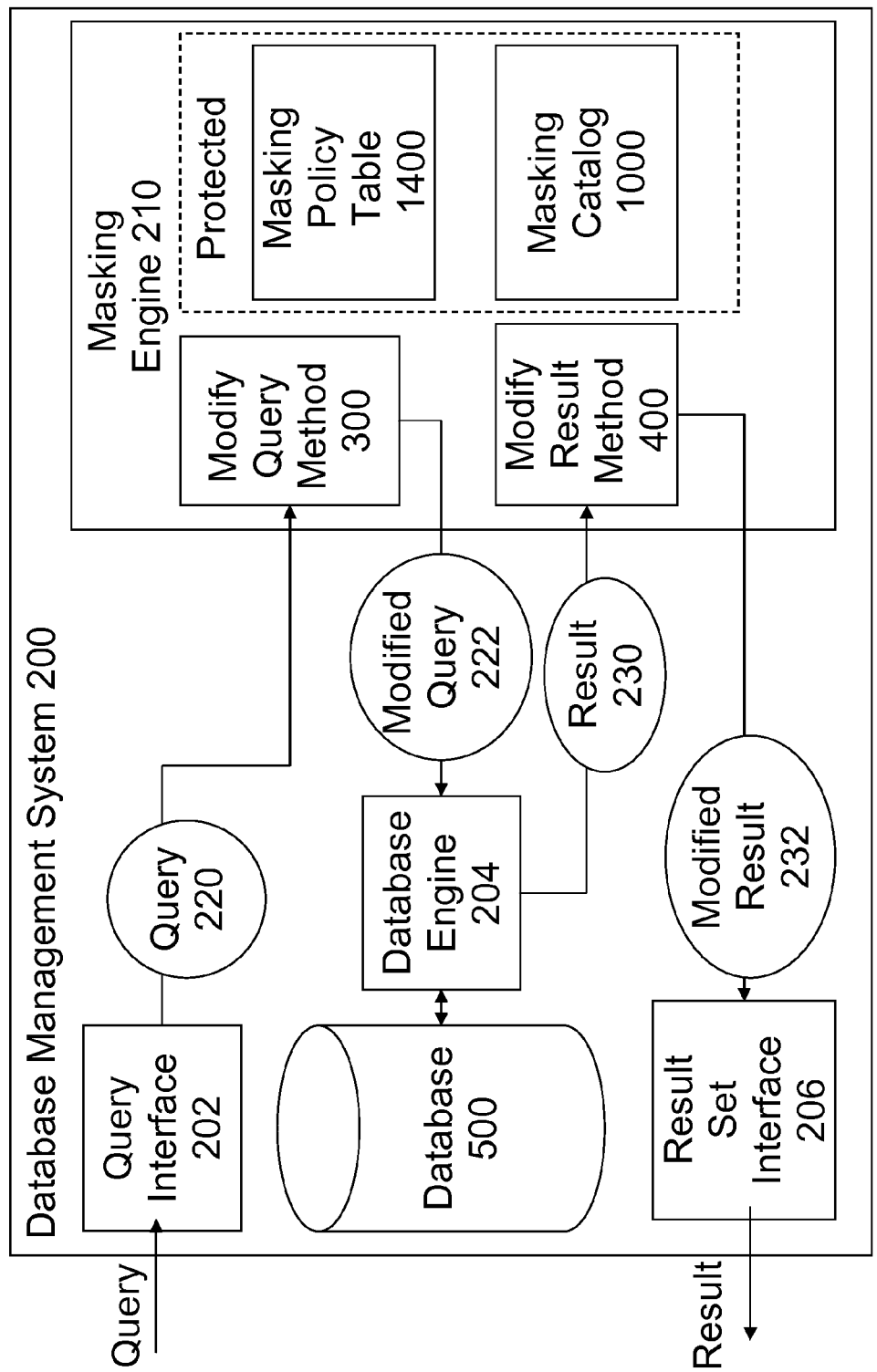
FIG. 2 is a component diagram of the database management system of an embodiment.

Referring to FIG. 2, an embodiment of the DBMS 200 includes the following components: query interface 202; database engine 204; result set interface 206; masking engine 210 and database 500. The components are shown as rectangles. Information passing from one component to another component includes query 220, modified query 222, result 230 and modified result 232 in the embodiment shown in FIG. 2. Information is shown as ovals in FIG. 2.

In contemporary systems, a query interface accepts a query from a user 8 and provides it to a database engine such as database engine 204. This is contrasted with embodiments described herein where query 220 is intercepted by query interface 202 and passed to masking engine 210 before it gets to database engine 204.

In embodiments, database engine 204 is used for performing database queries on database 500 according to modified query 222 and for passing result 230 back to the user 8. Masking engine 210 intercepts result 230. Result set interface 206 can received the modified result 232 from the database masking engine 210 and pass the modified result 232 to the user 8. Database 500 can store data sets so that they may be queried by the database engine 204. An example of the data stored by a database 500 is shown with respect to FIG. 5.

As shown in FIG. 2, an embodiment of masking engine 210 includes a modify query method 300; a modify result method 400; a masking policy table 1400; and a masking catalog 1000.

An embodiment of the modify query method 300 modifies query 220. The modifying is according to policies in masking policy table 1400 and masks in masking catalog 1000. The modify query method 300 returns modified query 222. Modify query method 300 is described in more detail below with reference to FIG. 3.

An embodiment of the modify result method 400 modifies result 230 that is received from database engine 204. The modifying is according to policies in masking policy table 1400 and masks in masking catalog 1000. The modify result method 400 returns modified result 232. Modify result method 400 is described in more detail below with reference to FIG. 4.

In accordance with embodiments, masking catalog 1000 and masking policy table 1400 are protected in the masking engine 210 so that only the modify query method 300 and the modify result method 400 can access them. Masking catalog 1000 is described further with reference to an example in FIGS. 10, 11, 12 and 16. Masking policy table 1400 is described further with reference to an example in FIG. 14.

Figure 3:
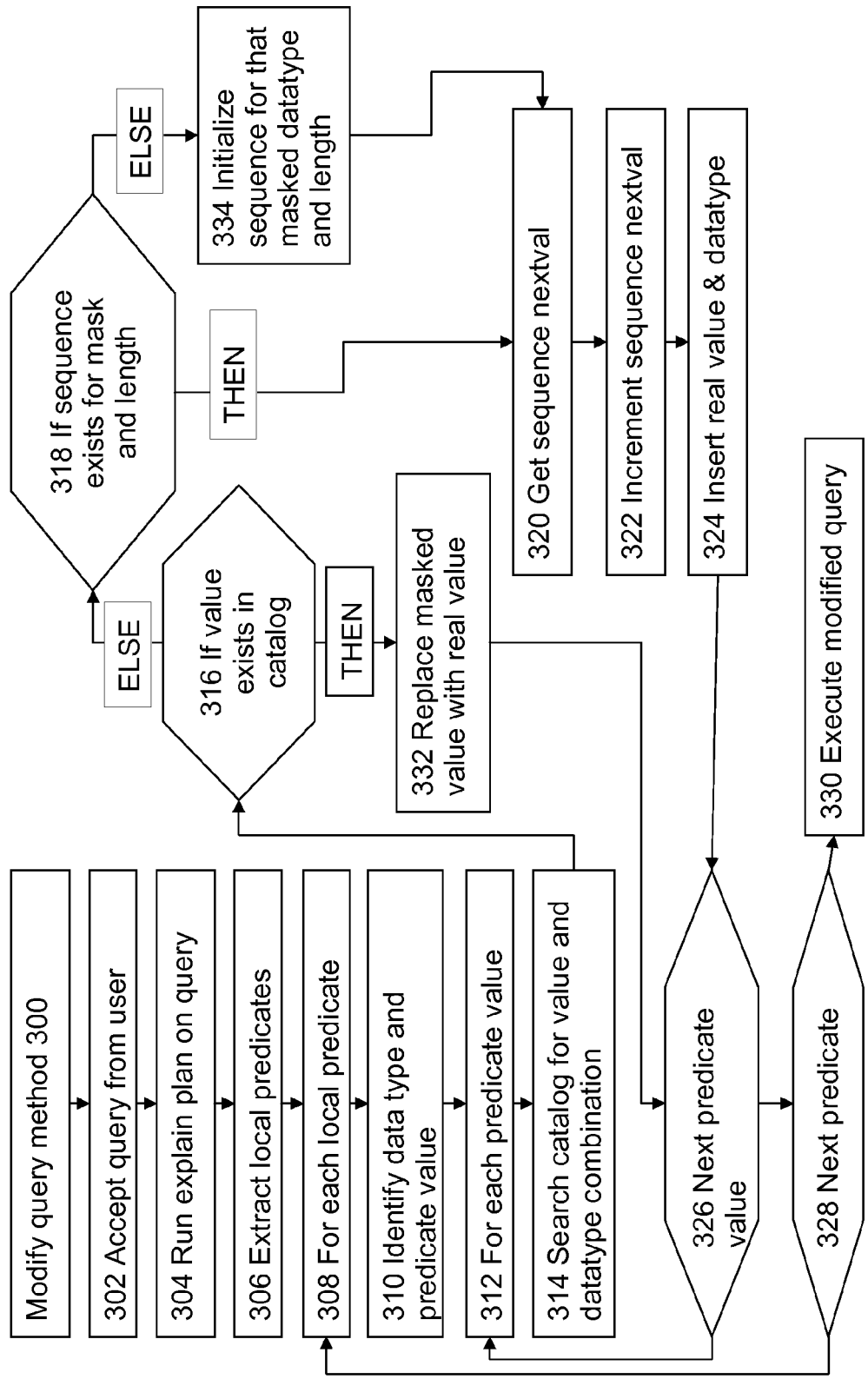
FIG. 3 is a flow diagram of a modify query process of an embodiment.

Referring now to FIG. 3, a modify query method 300 in accordance with an embodiment is generally shown.

Processing at block 302 of the modify query method 300 includes accepting query 220 from query interface 202.

Processing at block 304 includes executing an EXPLAIN PLAN command on query 220. EXPLAIN PLAN produces a full access path including local predicates for a given query. The output from EXPLAIN PLAN typically shows an expanded version of the query with a section for local predicates. In IBM® DB2®, for example, EXPLAIN PLAN outputs the predicates to a table. EXPLAIN PLAN output lends itself to a convenient means of identifying and extracting local predicates from queries.

Processing at block 306 includes extracting local predicates from the query.

Processing at block 308 includes defining a loop for each local predicate that is extracted. For example, if three local predicates are extracted (date, number, and a second date) then three cycles of the loop will be made.

Processing at block 310 includes identifying predicate data type (for example date, number and date) and predicate value (for example 12/2/1999, 12345, 11/2/1999) for each predicate.

Processing at block 312 includes defining a loop for each predicate value that is identified. A local predicate could have more than a single value in a clause.

Processing at block 314 includes searching masking catalog 1000 for the identified value and data type combination.

Processing at block 316 includes branching to block 318 if a value is located in masking catalog 1000 and branching to block 332 if not.

Processing at block 318 includes branching to block 320 if a sequence is located for the mask and length or branching to block 334 if not.

Processing at block 320 includes getting the next sequence value (nextval) from the located sequence. For sequential values this will increment the previous value for numbers and the previous character number for characters.

Processing at block 322 includes incrementing the next sequence value (nextval) in the located sequence.

Processing at block 324 includes inserting a real value and data type into the catalog.

Processing at block 326 includes branching back to block 312 if there is a next predicate value or moving on to block 328 if not.

Processing at block 328 includes branching back to block 308 if there is a next predicate or for continuing to block 330 if not.

Processing at block 330 includes executing the modified query.

Processing at block 332 includes replacing a masked value with real value and branching to block 326.

Processing at block 334 includes initializing a sequence for that masked data type and length and branching to block 320.

Figure 4:
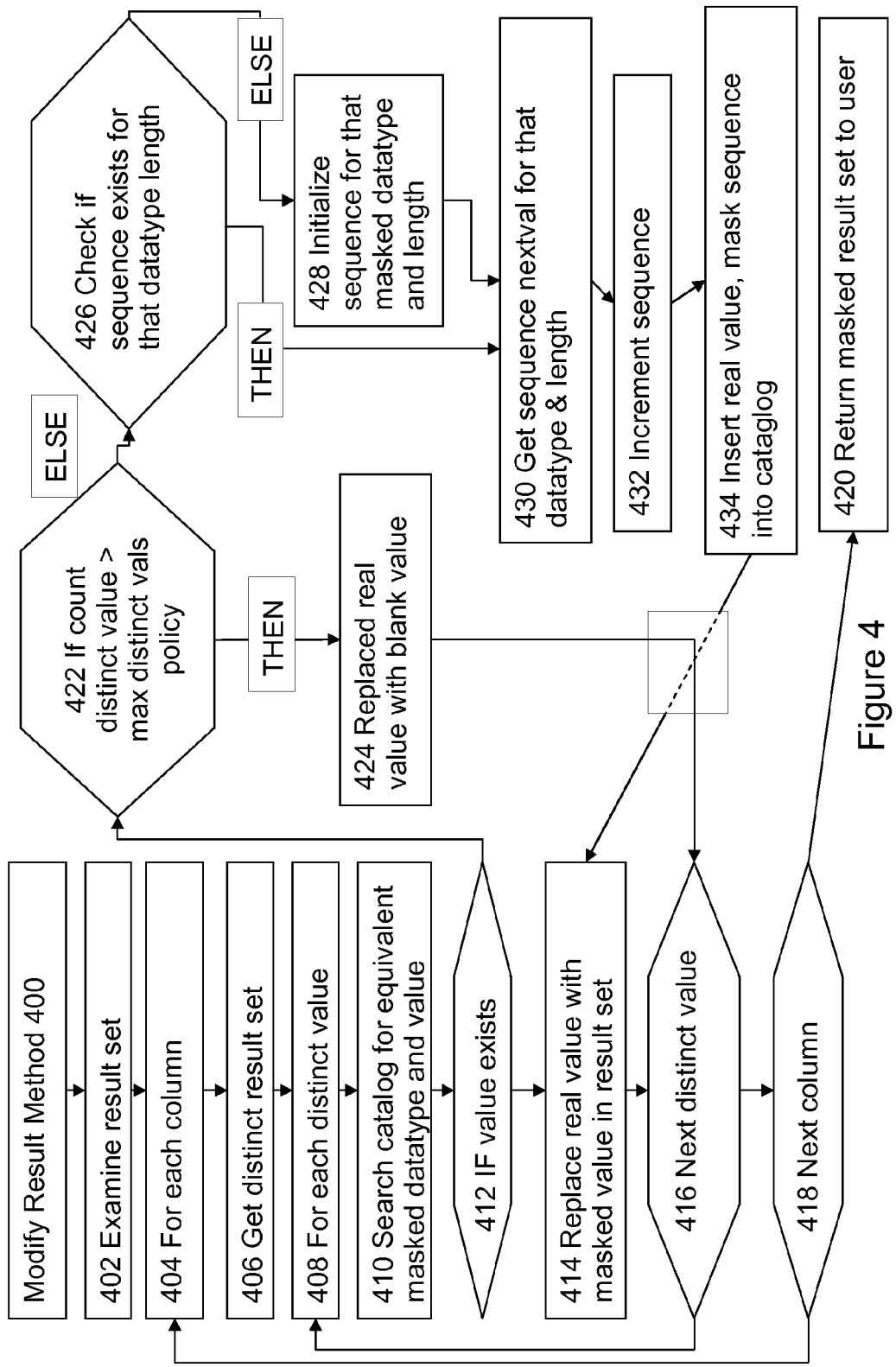
FIG. 4 is a flow diagram of a modify results method of an embodiment.

Referring to FIG. 4, a modify result method 400 in accordance with an embodiment is generally shown.

Processing at block 402 includes examining the result set intercepted from database engine 204.

Processing at block 404 includes defining a loop for each column in the intercepted result set.

Processing at block 406 includes getting a distinct result set. The distinct set of the column is the number of unique values in that column.

Processing at block 408 includes defining a loop for each distinct value in the column.

Processing at block 410 includes searching the masking catalog 1000 for equivalent masked data type and value.

Processing at block 412 includes branching to block 414 if a value is located in the masking catalog 1000 and branching to block 422 if it is not located.

Processing at block 414 includes replacing a real value in the result with a masked value thereby modifying or further modifying the result.

Processing at block 416 includes branching to block 408 if there is a next distinct value or continuing to block 418 if there is no next distinct value.

Processing at block 418 includes branching to block 404 if there is a next column or continuing to block 420 if there is no next column.

Processing at block 420 includes returning the modified result 232 to user 8 via interface 206.

Processing at block 422 includes branching to block 424 if a count distinct value is more than a maximum distinct value policy, and otherwise branching to block 426.

Processing at block 424 includes replacing a real value with a blank value.

Processing at block 426 includes branching to block 430 if a sequence exists for that data type length or else branching to block 428.

Processing at block 428 includes initializing a sequence for that masked data type and length.

Processing at block 430 includes providing the next value in a sequence for the respective data type and length.

Processing at block 432 includes incrementing the sequence.

Processing at block 434 includes inserting a real value and mask sequence pair into masking catalog 1000 and branching to block 414.

An example, referred to herein as "a main example," of the operation of an embodiment is described below with respect to FIGS. 5 to 17.

Figure 5:
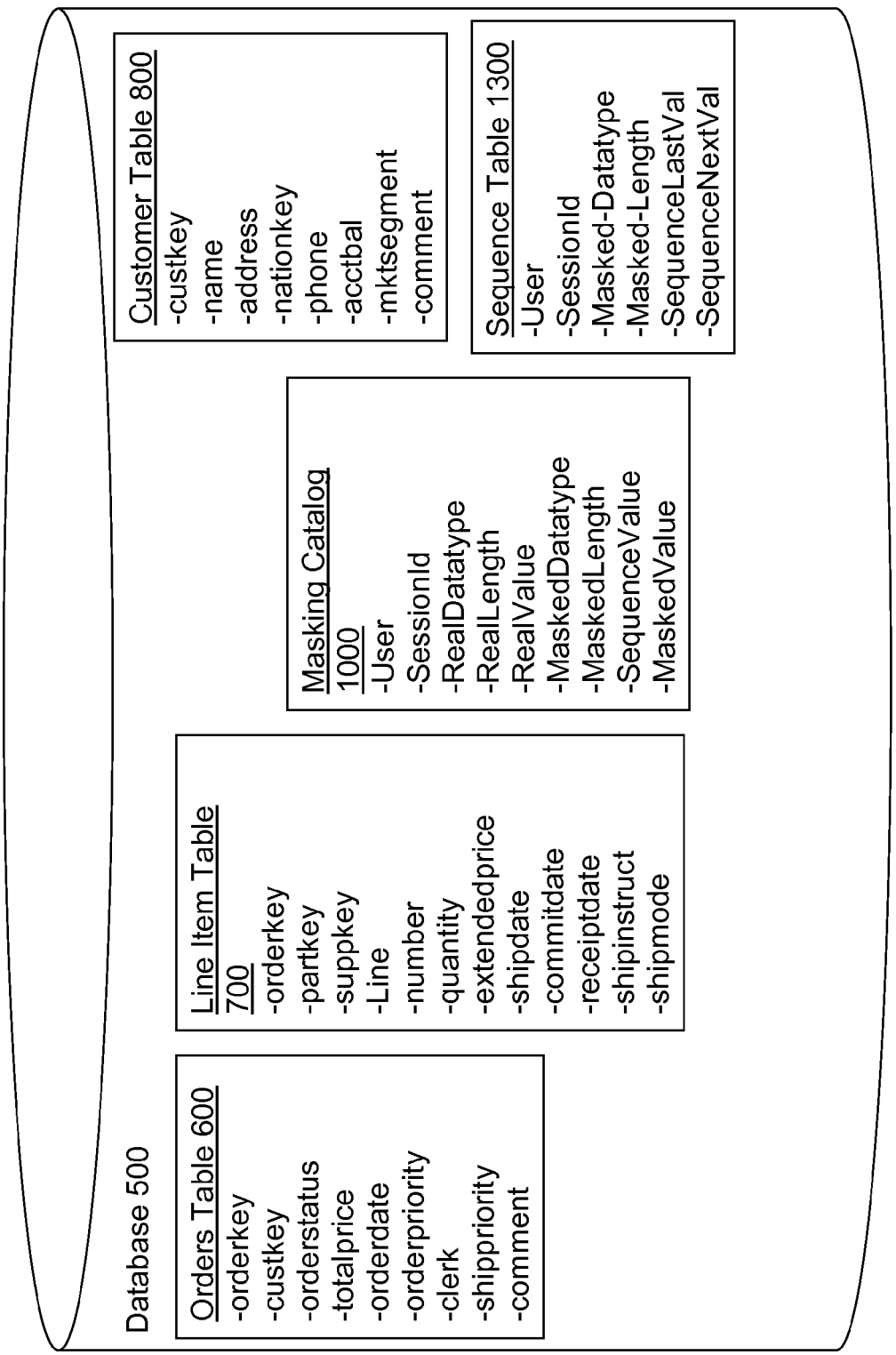
FIG. 5 is a database diagram showing data set tables and fields of an embodiment.

FIG. 5 shows example tables in a data set, in accordance with an embodiment, including: orders table 600; line item table 700; customer table 800; masking catalog 1000; and sequence table 1300.

The example orders table 600 includes the following fields: order key(orderkey); customer key (custkey); order status (orderstatus); total price (totalprice); order date (orderdate); order priority (orderpriority); clerk; ship priority (shippriority); and comment. In an embodiment, orders table 600 is defined by the schema:

CREATE TABLE ORDERS (O_REGIONKEY INTEGER NOT NULL,
 O_ORDERKEY INTEGER NOT NULL,
 O_CUSTKEY INTEGER NOT NULL,
 O_ORDERSTATUS CHAR(1) NOT NULL,
 O_TOTALPRICE DECIMAL(15,2) NOT NULL,
 O_ORDERDATE DATE NOT NULL,
 O_ORDERPRIORITY CHAR(15) NOT NULL,
 O_CLERK CHAR(15) NOT NULL,
 O_SHIPPRIORITY INTEGER NOT NULL,
 O_COMMENT VARCHAR(79) NOT NULL)

FIG. 6 shows an example orders table 600 of the main example with four example records. The first record contains: orderkey=100; custkey=735016; orderstatus=0; totalprice=214033.24; orderdate=2011-01-16; orderpriority=4-NOT SPECIFIED; clerk=Clerk#000002881; shippriority=0; comment="regular deposits sleep closely regular, regular packages."

The example line item table 700 includes the following fields: order key (orderkey); part key (partkey); supplemental key (suppkey); line (Line); number; quantity; extended price (extendedprice); ship date (shipdate); commit date (commitdate); receipt date (receiptdate); ship instructions (shipinstruct); and ship mode (shipmode). In an embodiment, line item table 700 is defined by the following schema:

CREATE TABLE LINEITEM (L_REGIONKEY INTEGER NOT NULL,
 L_ORDERKEY INTEGER NOT NULL,
 L_PARTKEY INTEGER NOT NULL,

L_SUPPKEY INTEGER NOT NULL,
L_LINENUMBER INTEGER NOT NULL,
L_QUANTITY DECIMAL(15,2)NOT NULL,
L_EXTENDEDPRICE DECIMAL(15,2)NOT NULL,
L_COMMITDATE DATE NOT NULL,
L_RECEIPTDATE DATE NOT NULL,
L_SHIPINSTRUCT CHAR(25) NOT NULL,
L_SHIPMODE CHAR(10) NOT NULL)

FIG. 7 shows an example line item table 700 of the main example with ten example records. The first record contains: orderkey=100; partkey=310144; suppkey=10145; Linenumber=1; quantity=28; Extendedprice=32315.64; shipdate=2011-01-06; commitdate=1998-05-13; receiptdate=1998-06-07; shipinstruct=COLLECT COD; and shipmode=TRUCK.

The example customer table 800 includes the following fields: customer key (custkey); name; address; nationality (nationkey); telephone number (phone); bank account balance (acctbal); market segment (mktsegment); and comment. In an embodiment, customer table 800 is defined by the following schema:

CREATE TABLE CUSTOMER (C_CUSTKEY INTEGER NOT NULL,
C_NAME VARCHAR(25)NOT NULL,
C_ADDRESS VARCHAR(40)NOT NULL,
C_NATIONKEY INTEGER NOT NULL,
C_PHONE CHAR(15)NOT NULL,
C_ACCTBAL DECIMAL(15,2)NOT NULL,
C_MKTSEGMENT CHAR(10)NOT NULL,
C_COMMENT VARCHAR(117)NOT NULL)

FIG. 8 shows the example customer table 800 of the main example with three example records. The first record includes: custkey=3580; name=John Andrews; address=34 Kennilworth Close, Dubin 6W; nationkey=7; phone=17-973-934-8451; acctbal=9446.07; mktsegment=FURNITURE; and comment="Customer is an important customer with many accounts."

The example masking catalog 1000 shown in FIG. 5 includes the following fields: user; session ID (SessionId); real data type (RealDatatype); real length(RealLength); real value (RealValue); masked data type (MaskedDataType); masked length (MaskedLength); sequence value (SequenceValue); and masked value (MaskedValue).

The example sequence table 1300 shown in FIG. 5 includes the following fields: user; session ID (sessionld); masked datatype (Masked-Datatype); masked length (MaskedLength); sequence last value (SequenceLastVal); and sequence next value (SequenceNextVal).

FIG. 9 shows results table 900, in accordance with an embodiment, from an example SQL query below applied to the example data set. Result table 900 stores the result data before it is modified. An embodiment of the example SQL query includes:

SELECT c_name, c_address, o_orderpriority, sum (l_quantity)
    sum_quantity, max(l_extendedprice) max_price
    FROM lineitem
    INNER JOIN orders ON o_orderkey=l_orderkey
    INNER JOIN customer ON c_custkey=o_custkey
    WHERE o_orderdate>, date ('2011-01-03')
    AND o_orderstatus='O'
    GROUP BY c_name, c_address, o_orderpriority
    HAVING max(l_extendedprice)>50000.00
    ORDER BY o_orderpriority The "SELECT" part of the query defines the columns to be included in the result. "c_name" is the customer name taken from the customer table 800. "c_address" is the customer address taken from the customer table 800. "o_orderpriority" is the orderpriority taken from the orders table 600. The "INNER JOIN" part of the query requires that the orders table 600, line item table 700 and customer table 800 be treated as a single table. The "WHERE" part of the query defines that the results should contain records where the order date (o_orderdate) is more than or equal to "2011-01-03" and the order status is "0". The "GROUP BY" part of the query defines that the result is grouped by c_name, c_address and c_orderpriority and sorted by o_orderpriority. The "HAVING" part of the query is a further filter applied to the results.

FIG. 9 shows that three records are located. The first record includes: c_name=John Andrews; c_address=34 Kennilworth Close, Dubin 6W; o_orderpriority=2-HIGH; sum_quantity=111; and max_price=55963.98.

Referring now to FIG. 10, an example of the masking catalog 1000 is generally shown in accordance with an embodiment before a query is made and is therefore empty. The following fields contain no values: User; Session Id; Real Datatype; Real Length; Real Value; Masked; Datatype Masked; Length Sequence; Value; and Masked Value.

Referring now to FIG. 11, an example of the masking catalog 1000 is generally shown in accordance with an embodiment during the masking example, that is, after the modify query method 300 has been executed and before the modify result method 400 has been applied. As shown in FIG. 11, three example records have been added. The first record includes: User=psmith; Session Id=1011; Real Datatype=Date; Real Length=10; Real Value=2011-01-03; Masked Datatype=Date; Masked Length=10; Sequence Value=1; and Masked Value=Jan. 1, 1900.

FIG. 12 shows an example of the masking catalog 1000 after modify result method 400 has been applied and fifteen further example records have been added. A blank row separates the first three records created by the modify query method 300 and the last fifteen records created by the modify result method 400. The record after the blank row includes: User=psmith; Session Id=1011; Real Datatype=Varchar(25); Real Length=25; Real Value=John Andrews; Masked Datatype=Char; Masked Length=12; Sequence Value=1; and Masked Value=aaaaaaaaaaaa.

FIG. 13 shows an example of the sequence table 1300 including example results that have been returned in accordance with an embodiment after the query has been executed. The first record includes: User=psmith; Session Id=1011; Masked-Datatype=Date; Masked-Length=10; Sequence last Val=1; and Sequence next Val=2. An embodiment of an algorithm described herein involves assigning masked equivalent values based on a sequential pattern. Numbers are assigned as sequences starting at $10^{(L-1)}$ where "L" is length and incremented by 1 each time. Characters are used to pad strings starting with a full complement of the letter a, and incrementing from the right most character. For example, a first value in a sequence for a masked character of length 2 is 'aa', a second is sequence is 'ab' and so on. Masked dates start at 1900-01-01 and increment daily.

Referring now to FIG. 14, an example masking policy table 1400 with example records in accordance with an embodiment is generally shown. The first record includes: Policy Id=1; Policy Name=max_distinct_vals; Description=Max distinct number of distinct values in a result set for a given column; Data type=Integer; and Value=1000. The first record defines that the maximum distinct number of values in a result set for a given column is 1000. The second record defines that the maximum masked length of a variable character string is 30 characters.

FIG. 15 shows an example of the results table 900 returned to a user after modification. The first record includes: c_name="aaaaaaaaaaaa"; c_address="aaaaaaaaaaaaaaaaaaaaaaaaaaaaaa"; o_orderpriority="aaaaaa"; sum_quantity=100; and max_price=10001. As shown in the results table 900, every field of every record has been masked with a unique character string or a unique number. Little original information can be gleaned from this masked result set.

Continuing with an embodiment of the main example, user psmith decides on a second query to drill further and retrieve the entire row from the customer table 800 for the first row returned and submits the following query using the masked parameter:

SELECT*FROM tpch.customer WHERE c_name='aaaaaaaaaaaa'

In an embodiment, this query is parsed by modify query method 300 and a lookup is performed on the local predicate on c_name, that is, the catalog is searched for Masked_Value="aaaaaaaaaaaa". The Real_Value of "John Andrews" is returned from the catalog and this is substituted in the query so that the modified query executed against the database is:

SELECT*FROM tpch.customer WHERE c_name='John Andrews'

In an embodiment, the result set returned, after the query is executed, from the customer table is then parsed and masked.

Turning now to FIG. 16, new rows added to the example masking catalog 1000 in response to the second query in accordance with an embodiment are shown. The top record in FIG. 16 includes: User=psmith; Session Id=1011; Real Datatype=Integer; Masked Datatype=Numeric; Masked Length=4; Real Value=3580; Sequence Value=1; and Masked Value=1000. In an embodiment, the result set returned from the customer table 800 is then parsed and masked.

FIG. 17 shows an embodiment of the modified results table 900. The record in the results table 900 includes: c_custkey=1000; c_name="aaaaaaaaaaaa"; c_address="aaaaaaaaaaaaaaaaaaaaaaaaaaaaaa"; c_nationkey=0; c_phone="aaaaaaaaaaaaab"; c_acctbal=1001; c_mktsegment="aaaaaaaaa"; c_comment="aaaaaaaaaaaaaaaaaaaaaaaaaaaaaab".

Little information about the actual data can be gleaned from the masking assignments. The user can decide to SELECT all customers within the "aaaaaaaaa" marketing segment, and so on. This example can easily be applied successfully to queries spanning a much larger database including more complex relationships etc.

The main example as discussed above is exemplary, and is not intended to be limiting. Of course, those skilled in the art will recognize many modifications may be made to this configuration without departing from the scope of embodiments of the present invention.

Embodiments may be implemented in a relational database management system (RDBMS) that manages one or more databases. Those skilled in the art will recognize that embodiments have application to any DBMS, and may be implemented in many different types and brands of such systems. For example, those skilled in the art will recognize that any combination of different components, including computer programs, peripherals, and other devices, may be used to implement embodiments of the present invention, so long as similar functions are performed.

It will be clear to one of ordinary skill in the art that all or part of the method of embodiments described herein may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of exemplary embodiments may suitably be embodied in alternative logic apparatus or apparatuses comprising logic elements to perform equivalent functionality using equivalent method steps, and that such logic elements may comprise components such as logic gates in, for example a programmable logic array or applicationspecific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An alternative embodiment may be realized in the form of a computer implemented method of deploying a service comprising steps of deploying computer program code operable to, when deployed into a computer infrastructure and executed thereon, cause the computer system to perform all the steps of the method.

In a further alternative, an embodiment may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A method for data masking in database operations, the method comprising:
   intercepting a database query;
   identifying at least one field in the query that includes masked data;
   unmasking the query, the unmasking on a processor and comprising substituting the masked data with equivalent real values;
   sending the unmasked query to a database engine;
   intercepting a result provided by the database engine in response to the unmasked query;
   identifying values in the result corresponding to sensitive information;
   masking the result, the masking on a processor and comprising substituting the values in the result corresponding to sensitive information with masked data equivalents, wherein a length of a masked data equivalent is shortened if a data type of the masked data equivalent is a fixed length that exceeds a maximum length policy; and
   returning the masked result to a user.

2. The method according to claim 1, wherein each masked data equivalent is a unique mask.

3. The method according to claim 2, wherein each unique mask is chosen from a non-repeating sequence.

4. The method according to claim 1, wherein all fields in the query are masked.

5. The method according to claim 1, wherein the masked data is deleted at a completion of a user session.

6. The method according to claim 1, wherein a list of types of sensitive information for masking and unmasking is maintained.

7. The method according to claim 1, wherein the masked and associated data is associated with a user account and is selected for the user when the user is logged into the user account.

8. The method according to claim 1, wherein a length of the masked result is the same as the length of the result provided by the database engine.

9. The method according to claim 1, wherein the masked data equivalent is stored with its associated real value in a catalog.

10. A system configured to perform data masking in database operations, the system comprising:
    a memory having computer readable computer instructions; and
    a processor for executing the computer readable instructions, the instructions including:
    intercepting a database query;
    identifying at least one field in the query that includes masked data;
    unmasking the query, the unmasking comprising substituting the masked data with equivalent real values;
    sending the unmasked query to a database engine;
    intercepting a result provided by the database engine in response to the unmasked query;
    identifying values in the result corresponding to sensitive information;
    masking the result, the masking comprising substituting the values in the result corresponding to sensitive information with masked data equivalents, wherein a length of a masked data equivalent is shortened if a data type of the masked data equivalent is a fixed length that exceeds a maximum length policy; and
    returning the masked result to a user.

11. The system according to claim 10, wherein each masked data equivalent is a unique mask.

12. The system according to claim 11, wherein each unique mask is chosen from a non-repeating sequence.

13. The system according to claim 10, where all fields in the query are masked.

14. The system according to claim 10, wherein the masked data is deleted at a completion of a user session.

15. The system according to claim 10, wherein a list of types of sensitive information for masking and unmasking is maintained.

16. The system according to claim 10, wherein the masked and associated data is associated with a user account and is selected for the user when the user is logged into the user account.

17. The system according to claim 10, wherein a length of the masked result in the same as the length of the result provided by the database engine.

18. A computer program product for data masking in database operations, the computer program product comprising:
    a non-transitory computer readable storage medium having computer readable program code embodied therewith, the computer readable program code executable by a processor to:
    intercept a database query;
    identify at least one field in the query that includes masked data;
    unmask the query, the unmasking comprising substituting the masked data with equivalent real values;
    send the unmasked query to a database engine;
    intercept a result provided by the database engine in response to the unmasked query;
    identify values in the result corresponding to sensitive information;
    mask the result, the masking comprising substituting the values in the result corresponding to sensitive information with masked data equivalents, wherein a length of a masked data equivalent is shortened if a data type of the masked data equivalent is a fixed length that exceeds a maximum length policy; and
    return the masked result to a user.

19. The computer program product of claim 18, wherein each masked data equivalent is a unique mask chosen from a non-repeating sequence.

* * * * *